(12) United States Patent
Dicleli (10) Patent No.: US 11,384,558 B2
(45) Date of Patent: Jul. 12, 2022

(54) MULTIDIRECTIONAL ADAPTIVE RE-CENTERING TORSION ISOLATOR

(71) Applicant: Murat Dicleli, Ankara (TR)

(72) Inventor: Murat Dicleli, Ankara (TR)

( * ) Notice: Subject to any disclaimer, the term of this patent is extended or adjusted under 35 U.S.C. 154(b) by 257 days.

(21) Appl. No.: 16/771,707

(22) PCT Filed: Feb. 7, 2019

(86) PCT No.: PCT/TR2019/050077
§ 371 (c)(1),
(2) Date: Jun. 11, 2020

(87) PCT Pub. No.: WO2019/203766
PCT Pub. Date: Oct. 24, 2019

(65) Prior Publication Data
US 2020/0392752 A1 Dec. 17, 2020

(30) Foreign Application Priority Data
Feb. 9, 2018 (TR) .................................. 2018/01822

(51) Int. Cl.
*E04H 9/02* (2006.01)
*E04B 1/98* (2006.01)
*F16F 15/04* (2006.01)

(52) U.S. Cl.
CPC .............. *E04H 9/021* (2013.01); *E04B 1/98* (2013.01); *F16F 15/04* (2013.01); *F16F 2232/06* (2013.01); *F16F 2236/08* (2013.01)

(58) Field of Classification Search
CPC . E04H 9/021; E04H 9/023; E04B 1/98; F16F 2236/08; F16F 15/04; F16F 2232/06; F16F 15/063
See application file for complete search history.

(56) References Cited

U.S. PATENT DOCUMENTS

| | | | |
|---|---|---|---|
| 2001/0029711 A1 | 10/2001 | Kim | |
| 2012/0066986 A1* | 3/2012 | Dicleli | E01D 19/043 52/167.1 |

FOREIGN PATENT DOCUMENTS

| CN | 101812879 A | | 8/2010 | |
| CN | 205152781 U | | 4/2016 | |
| CN | 108412050 A | * | 8/2018 | ............... E04B 1/38 |
| CN | 111851816 A | * | 10/2020 | |
| CN | 112065137 A | * | 12/2020 | ............... E04B 1/98 |
| CN | 112282096 A | * | 1/2021 | ............... E01D 19/00 |
| CN | 112982715 A | * | 6/2021 | |
| CN | 112983103 A | * | 6/2021 | |
| CN | 113062487 A | * | 7/2021 | |

* cited by examiner

*Primary Examiner* — Babajide A Demuren
(74) *Attorney, Agent, or Firm* — Bayramoglu Law Offices LLC (57) ABSTRACT

A multidirectional adaptive re-centering torsion isolator is used for isolating buildings, tanks and bridges from earthquakes. The multidirectional adaptive re-centering torsion isolator includes a flat and/or articulated slider and four or more cylindrical energy dissipaters. The flat and/or articulated slider positioned on top of the column provides vertical load transmission, low friction and horizontal displacement capacity. The cylindrical energy dissipaters provide displacement, re-centering and damping in any of the horizontal directions.

7 Claims, 7 Drawing Sheets

MULTIDIRECTIONAL ADAPTIVE RE-CENTERING TORSION ISOLATOR

CROSS-REFERENCE TO THE RELATED APPLICATIONS

This application is the national phase entry of International Application No. PCT/TR2019/050077, filed on Feb. 7, 2019, which is based upon and claims priority to Turkish Patent Application No. 2018/01822, filed on Feb. 9, 2018, the entire contents of which are incorporated herein by reference.

TECHNICAL FIELD

The invention subject matter of the application is related to a multidirectional adaptive re-centering torsion isolator that is used for isolating buildings, tanks and bridges from earthquakes.

BACKGROUND

In the known state of the art, torsion isolators only functions as dampers. The plurality of rail systems in the isolators make the isolators very heavy. The isolators are positioned to a single location of the structure they are supposed to damp. Thus, efficient damping cannot be provided.

The present invention solves the abovementioned problems. The isolator is lightweight since there are 4 rail systems in the present invention. The energy dissipaters in the multidirectional adaptive re-centering torsion isolators are located on the columns. The present invention has both damping and load bearing properties. The distinctive feature in the power change of the multidirectional adaptive re-centering torsion isolator in response to energy dissipater units is the geometrical stiffening behavior.

SUMMARY

The invention subject matter of the application is related to a multidirectional adaptive re-centering torsion isolator that is used for isolating buildings, tanks and bridges from earthquakes. The multidirectional adaptive re-centering torsion isolator consists of a flat and/or articulated slider (13) and four or more cylindrical energy dissipaters. The flat and/or articulated slider (13) positioned on top of the column provides vertical load transmission, low friction and horizontal displacement capacity. The cylindrical energy dissipaters provide displacement, re-centering and damping in any of the horizontal directions.

The multidirectional adaptive re-centering torsion isolator is an integrated system with hysteretic energy dissipater units and a flat and/or articulated slider (13) that operates as an earthquake isolator. The flat bearings of the multidirectional adaptive re-centering torsion isolator support the vertical loads. The hysteretic energy dissipater units provide damping and re-centering. The hysteretic energy dissipater units (hysteretic dampers) of the multidirectional adaptive re-centering torsion isolator are the cylindrical energy dissipaters.

In order to achieve the abovementioned objective that will be apparent from the detailed description provided below, the present invention is characterized by comprising a flat and/or articulated slider (13) that provides vertical load transmission, low friction and horizontal displacement capacity and that is positioned on top of the column and at least two or more cylindrical energy dissipaters that provide displacement, re-centering and horizontal damping in any of the horizontal directions.

In a preferred embodiment of the invention, each energy dissipater unit comprises an energy dissipater that is mounted to the column through the diaphragm plate and that is in a cylindrical form with enlarged ends which are retained in the diaphragm plate by the lubricated cylindrical sliding bearings 2, the arm connected to the energy dissipater, the sliding block that is connected to the ends of the arms by using an installation shaft, a cylindrical sliding bearing 1 installed between the installation shaft and the sliding block, the base plate that is mounted on the bottom part of the energy dissipater and the rail that is clamped to the superstructures such as buildings and tanks through clamping bolts.

Another preferred embodiment of the invention comprises rail, a channel shaped rail and three plates that are welded to form the stainless-steel plates bolted to the inner parts of the rails on which the sliding blocks slide on the rails.

In another preferred embodiment of the invention, the energy dissipaters are connected to the arms and the base plate by a seamless plug type connection.

Another preferred embodiment of the invention comprises four or more energy dissipaters.

Another preferred embodiment of the invention comprises the connection plate 1 that is connected to the column on the diaphragm plate level and the connection plate 2 that is connected to the column on the base plate level.

Another preferred embodiment of the invention comprises the process steps of;
- Connecting each energy dissipater to a torsion arm and torsion by rotation of the arm,
- Connecting the arm to a rail in order to convert the rotational earthquake motion of the structure to the torsion of the energy dissipaters and said rail guiding the motion of the arm through the low friction sliding block installed to the end of the arm,
- Controlling the arms to move along the path pre-determined by the rails regardless of the direction of the displacement exerted on the rail.

BRIEF DESCRIPTION OF THE DRAWINGS

The figures that are prepared to provide a better understanding of the multidirectional adaptive re-centering torsion isolator developed by this invention that is used for seismic isolation of the buildings, tanks and bridges are described below.

FIG. 7 shows, (a) Reaction of the energy dissipater units (dampers) of the multidirectional adaptive re-centering torsion isolator for stiffening indices of different designs (HI=Fmax/FY) (the force values are normalized by Fy) and (b) targeted stiffening index by adjusting the length of the arm.

The components present in the figures to provide a better understanding of the multidirectional adaptive re-centering torsion isolator developed by this invention that is used for seismic isolation of the buildings, tanks and bridges are given individual reference numbers and each reference number refers to;

1. Energy dissipater
2. Arm
3. Sliding Block
4. Sliding Bearing 1
5. Installation Shaft
6. Diaphragm Plate
7. Sliding Bearing 2
8. Base plate
9. Connection Plate 1
10. Connection Plate 2
11. Rail
12. Column
13. Flat and/or Articulated Slider
22. Torsional Moment
23. Length of Arm
24. Plastic Torsional Moment
25. Torsion Angle 1
26. Displacement 1
27. Torsion Angle 2
28. Displacement 2

DETAILED DESCRIPTION OF THE EMBODIMENTS

The invention subject matter of the application is related to the multidirectional adaptive re-centering torsion isolator that is used for isolating the buildings, tanks and bridges from the earthquakes.

In this detailed description, the novelty of the invention is described by the non-limiting examples for providing a better understanding of the subject. The multidirectional adaptive re-centering torsion isolator in accordance with this is described.

Referring to FIGS. 1-4, the main components of the hysteretic energy dissipater unit are shown. Each energy dissipater unit comprises an energy dissipater (1) that is in a cylindrical form with enlarged ends which are retained in the diaphragm plate (6) by the lubricated cylindrical sliding bearings 2 (7), the arm (2) connected to the energy dissipater (1), the sliding block (3) that is connected to the ends of the arms (2) by using an installation shaft (5), a cylindrical sliding bearing 1 (4) (PTFE) installed between the installation shaft (5) and the sliding block (3), the base plate (8) that is mounted on the bottom part of the energy dissipater (1) and the rail (11) that is clamped to the superstructures such as buildings and tanks through clamping bolts. As the material for the sliding bearings 2 (7), special sliding materials with low friction and high strength such as MSM® or PTFE® are used.

The diaphragm plate (6) and the base plate (8) are mounted to the concrete column (12) (substructure) through the connection plate 1 (9) and the connection plate 2 (10) on which they are welded. The connection plate 1 (9) is connected to the column at the diaphragm plate (6) level and the connection plate 2 (10) is connected to the column at the base plate (8) level. The rail (11) is formed by a channel shaped rail and three plates that are welded to form the stainless-steel plates bolted to the inner parts of the rails on which the sliding blocks (3) slide on the rails. The multidirectional adaptive re-centering torsion isolator is designed to dissipate the energy of the earthquake by flexing of the energy dissipaters (1) during torsion and here the torsion occurs in the single type component of the energy dissipater (1). Each energy dissipater (1) is connected to a torsion arm (2) and twists with the rotation of the arm (2). In order to convert the rotational earthquake motion of the structure (displacement between the superstructure and the substructure) to the twisting of the energy dissipaters (1), the arm (2) is connected to a rail (11) and said rail (11) guides the motion of the arm (2) through the low friction sliding block (3) installed to the end of the arm (2). In this way, the arms (2) are controlled to move along the path pre-defined by the rails (11) regardless of the direction of the displacement exerted on the rail (11) and thus a guided follow-up reel connection is provided.

Figure 1:
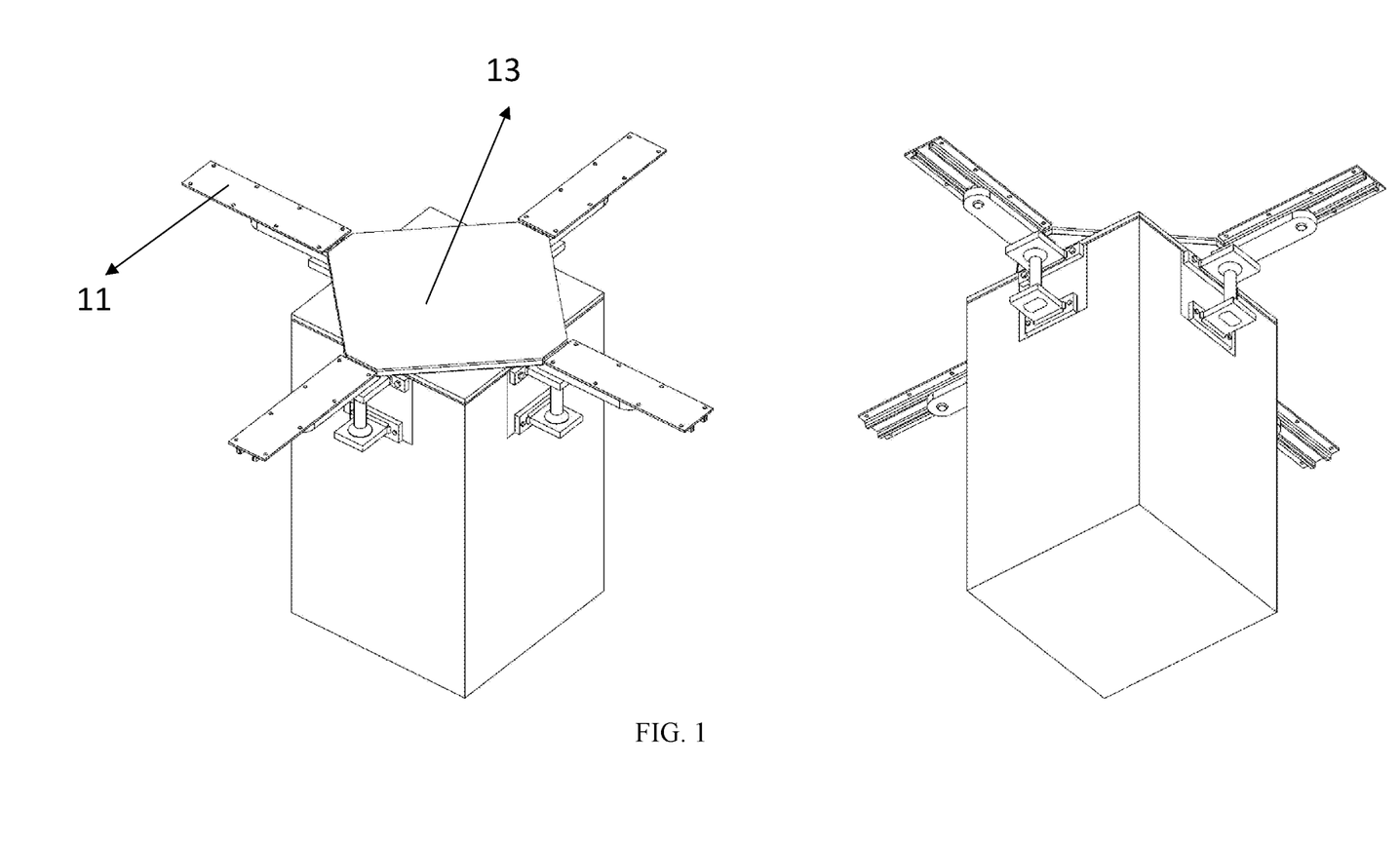
FIG. 1 shows a 3 dimensional top and bottom view of the multidirectional adaptive re-centering torsion isolator system.
Figure 2:
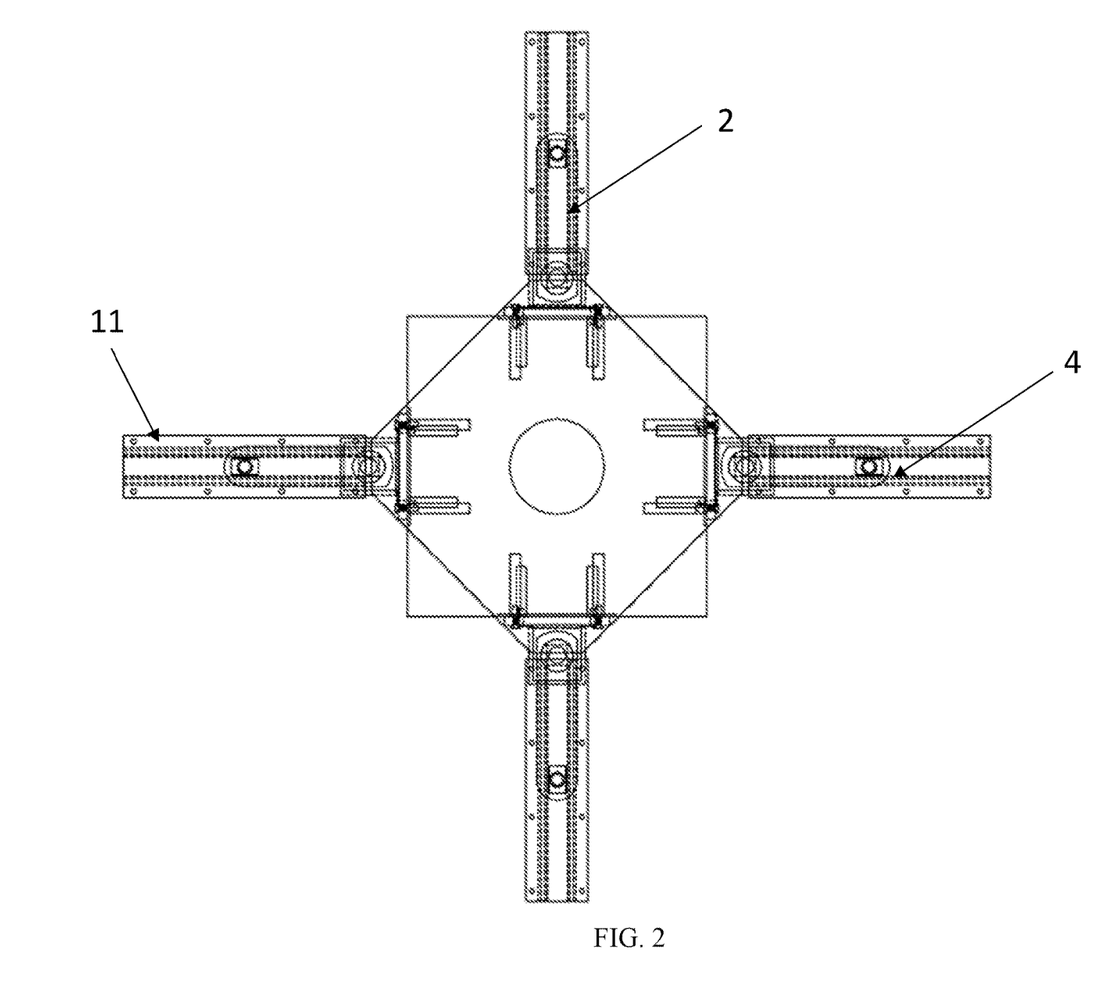
FIG. 2 shows the top view of the multidirectional adaptive re-centering torsion isolator.
Figure 3:
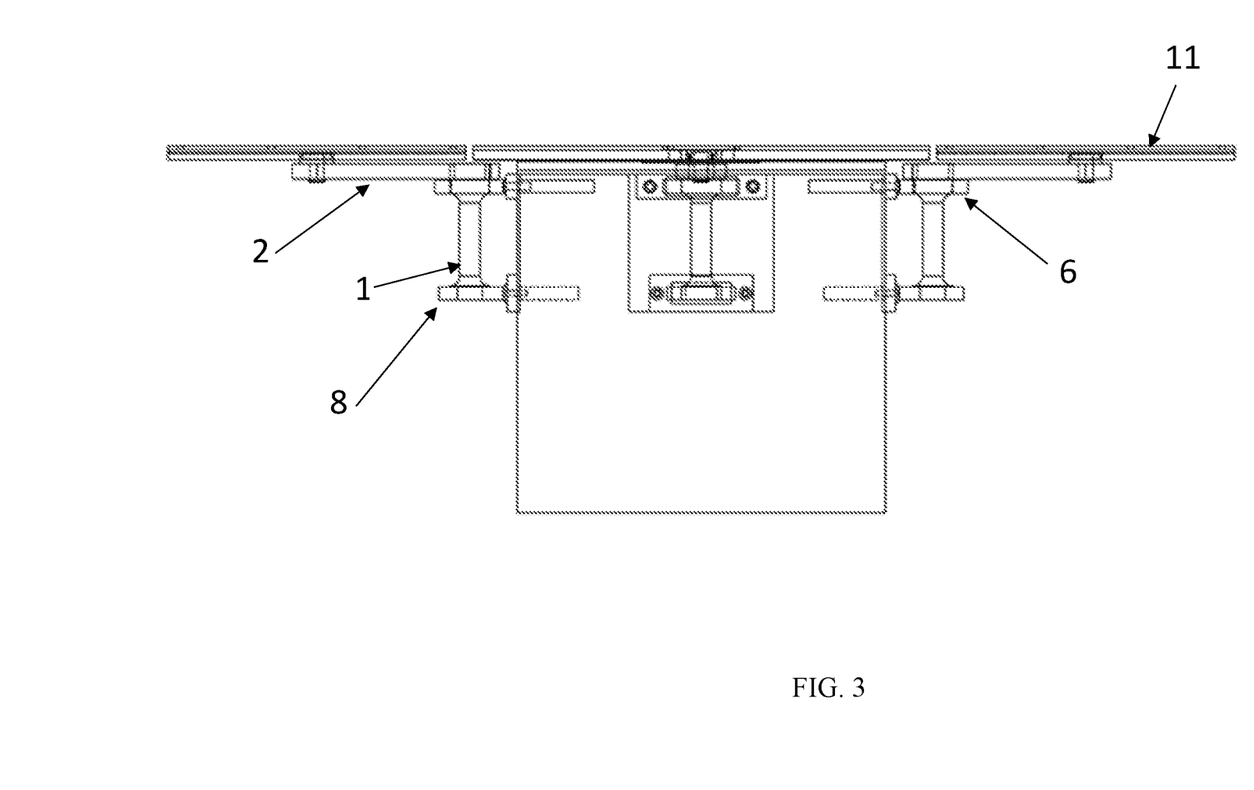
FIG. 3 shows the side view of the multidirectional adaptive re-centering torsion isolator.
Figure 4:
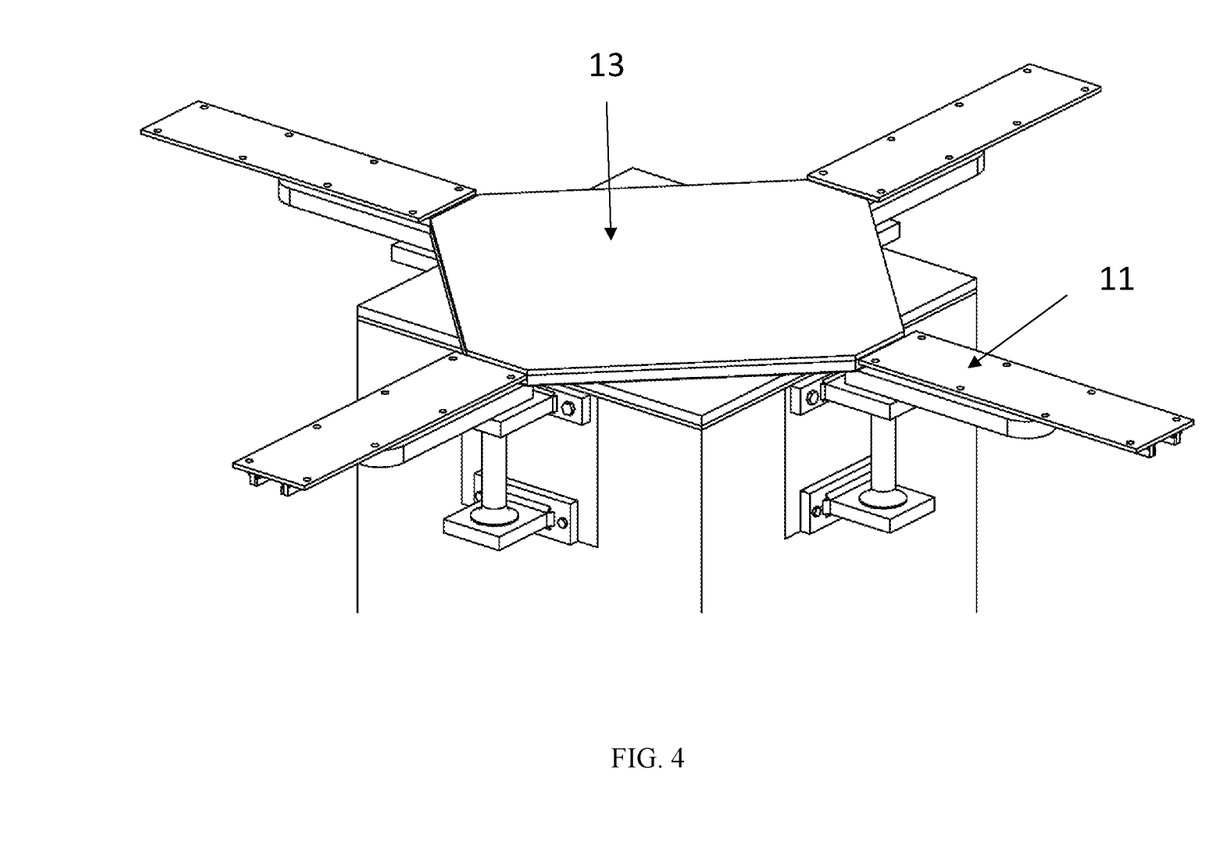
FIG. 4 shows the 3-dimensional view of the multidirectional adaptive re-centering torsion isolator.
Figure 5:
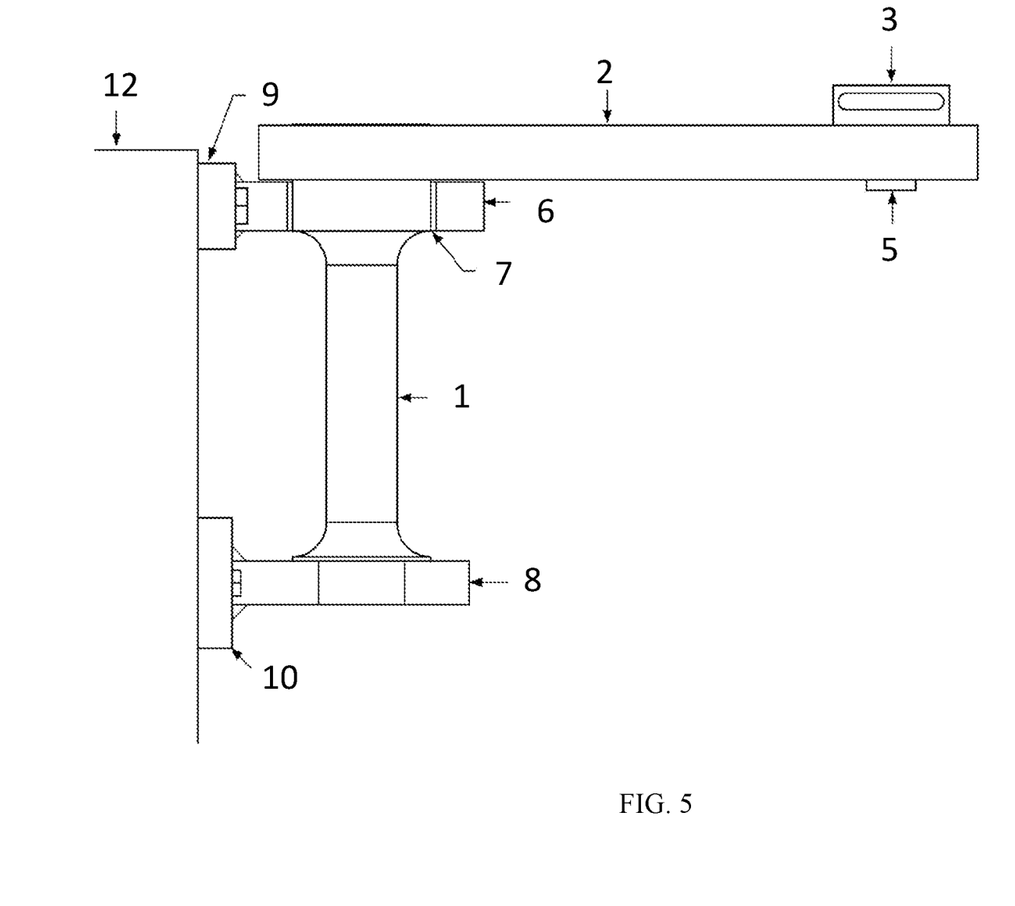
FIG. 5 shows the cross-sectional view illustrating the hysteretic damper (the energy dissipater unit of the multidirectional adaptive re-centering torsion isolator) for one torsion.

The rail (11) is clamped to the superstructure (building, tank etc.) by the clamping bolts. Thus, the energy dissipaters (1) are installed to the column (12) (substructure) through the inside of the diaphragm plate (6) as shown in FIG. 5. The diaphragm plate (6) transmits the torsional and fracture forces exerted by the energy dissipaters (1) through the arms (2) on the upper part to the inside of the column (12). Then, the single type components of the energy dissipaters (1) are protected against significant torsional and fractural effects and thus almost a single type of torsional flexure is provided. A plug type connection (seamless) is used to connect the energy dissipaters (1) to the arms (2) and the base plate (8). Thus, the energy dissipaters (1) can be easily replaced if they get damaged after a potential earthquake. By the arrangement described above, the displacements of the structure (displacement between the sub- and the super-structures) due to earthquake cause displacement of the rails (11) of the multidirectional adaptive re-centering torsion isolator and the rotation of the arms (2) and the torsion of the energy dissipaters (1) are resisted by the energy dissipaters (1) of the multidirectional adaptive re-centering torsion isolator. Meanwhile, the weight of the structure is supported and transmitted to the columns (12) by the flat and/or articulated slider (13).

The distinctive property of the multidirectional adaptive re-centering torsion isolator in force change against the energy dissipater (1) units is the geometrical stiffening behavior. The displacements originating from the earthquake are reduced as the result of the geometric stiffening. Said property is the result of conversion of the twisting motion to rotation. When referred to FIG. 6, the bottom operational mechanism of the energy dissipater units of the multidirectional adaptive re-centering torsion isolator which causes the geometric stiffening is shown. The mechanism shown in FIG. 6 increases the reaction of the force that is required to balance the torsion in the energy dissipaters.

Figure 6:
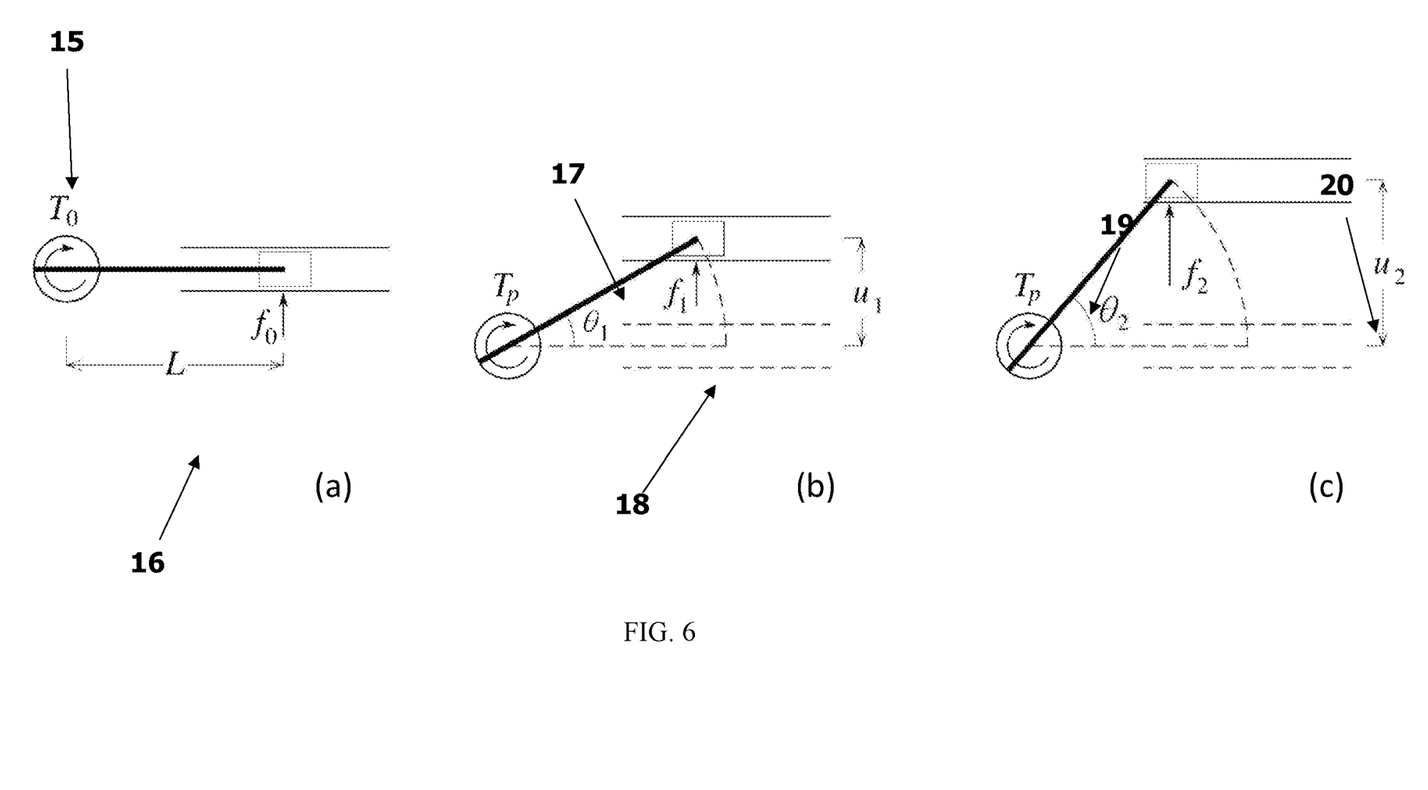
FIG. 6 shows the bottom operational mechanism of the energy dissipater units of the multidirectional adaptive re-centering torsion isolator which causes geometric stiffening.
Figure 7:
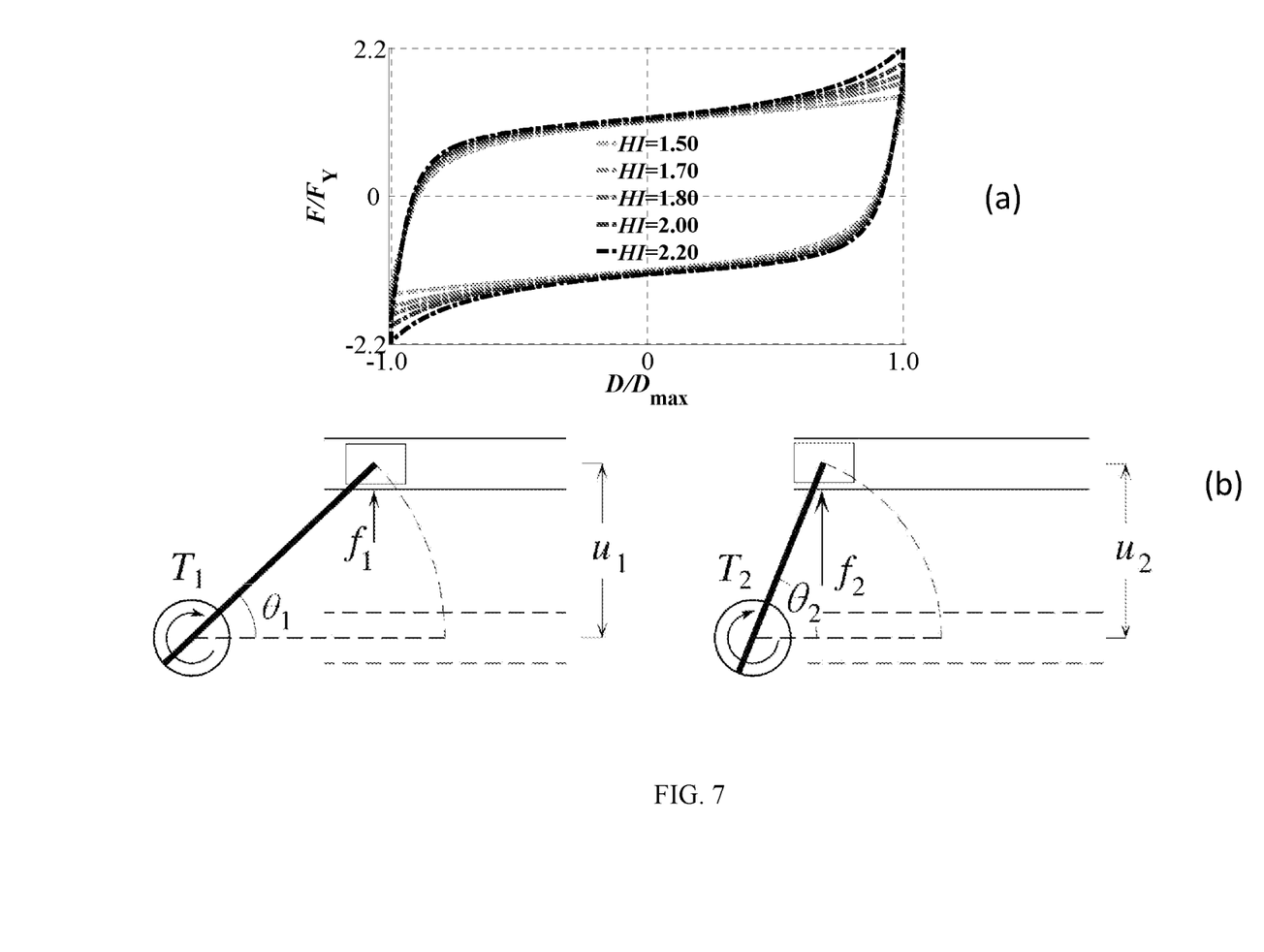

This situation is described as following by referring to FIG. 6. In FIG. 6(a), the initial position of the arm is shown when the rotation starts where the force $F_0$ applied to the rail (11) is perpendicular to the arm (2). Meanwhile, the torsion in the energy dissipater (1) is $T_0 = F_0 L$. Here, "L" is the length of the arm (2). In the next step, in FIG. 6(b), the arm rotates by an angle $\theta_1$ and reaches the plastic torsional capacity $T_p$. Thus, the torsion in the energy dissipater (1) is shown as $T_p = F_1 L \cos \theta_1$ where the applied by the rail (1) is $F_1$. As shown in FIG. 6(c), after the additional displacement of the rail (11), the arm (2) rotates and reaches a larger angle $\theta_2$. In this direction, the torsion in the energy dissipater (1) is shown as $T_p=F_2L \cos \theta_2$ where the applied by the rail (1) is $F_2$. In this case $\theta_2>\theta_1$ and $\cos \theta_2<\cos \theta_1$. Therefore, in order to make $T=T_p$ inside the energy dissipaters (1), in other words to make the energy dissipater flexible to dissipate the energy, the force $F_2$ must be bigger than the force $F_1$. Specifically, this situation results in the geometric stiffening behavior shown in FIG. 7(a). In FIG. 7(a), the curves of the force-displacement hysteresis loops are shown for energy dissipaters in the multidirectional adaptive re-centering torsion isolator designed to make the stiffening happen in different levels. As shown in the plotting, the reaction force increases with the increasing displacement. In these graphics, the displacement values are normalized to the maximum displacement capacity and the force values are normalized to the yielding force of the energy dissipater.

The same mechanism also enables controlling the desired stiffening level in response to the force-displacement by adjusting the length of the arm (2). This is schematically shown in FIG. 7(b). Various stiffness levels obtained in this manner cause the hysteresis loops of different shapes shown in FIG. 7(a). As indicated in these graphics, the parameter that is used to characterize the stiffening in the multidirectional adaptive re-centering torsion isolator is called as "Stiffening Index" which is defined as:

$$HI = \frac{F_{max}}{F_Y}$$

Here, $F_{max}$ and $F_Y$ are the maximum force capacity (the force at $D_{max}$) and the effective efficiency force of the multidirectional adaptive re-centering torsion isolator.

What is claimed is:

1. A multidirectional adaptive re-centering torsion isolator, comprising a flat and/or articulated slider, wherein the flat and/or articulated slider enables a vertical load transmission, a low friction and a horizontal displacement capacity and the flat and/or articulated slider is located on a top of a column and at least two or more cylindrical energy dissipaters, wherein the at least two or more cylindrical energy dissipaters provide a re-centering and a damping in a horizontal direction.

2. The multidirectional adaptive re-centering torsion isolator according to claim 1, further comprises a plurality of energy dissipater units, wherein each energy dissipater unit of the plurality of energy dissipater units comprises an energy dissipater of the plurality of energy dissipaters, wherein the energy dissipater of the plurality of energy dissipaters is in a cylindrical form with a plurality of enlarged ends and the plurality of enlarged ends are retained in a diaphragm plate by a second lubricated cylindrical sliding bearing and the second lubricated cylindrical bearing is installed to the column through the diaphragm plate, an arm of a plurality of arms is connected to the energy dissipater of the plurality of energy dissipaters, a sliding block of a plurality of sliding blocks is connected to a plurality ends of the plurality of arms by using an installation shaft, a first cylindrical sliding bearing is installed between the installation shaft and the sliding block of the plurality of sliding blocks, a base plate is mounted on a bottom part of the energy dissipater of the plurality of energy dissipaters and a rail of a plurality of rails is clamped to a plurality of superstructures through a plurality of clamping bolts; wherein the plurality of superstructures are selected from the group consisting of buildings and tanks.

3. The multidirectional adaptive re-centering torsion isolator according to claim 2, further comprising, a channel shaped rail and three plates, wherein the three plates are welded to form a plurality of stainless-steel plates bolted to a plurality of inner parts of the plurality of rails, wherein on the plurality of inner parts of the plurality of rails the plurality of sliding blocks slide on the plurality of rails.

4. The multidirectional adaptive re-centering torsion isolator according to claim 1, wherein the plurality of energy dissipaters are connected to a plurality of arms and a base plate by a seamless plug type connection.

5. The multidirectional adaptive re-centering torsion isolator according to claim 1, wherein there are at least four or more of the cylindrical energy dissipaters.

6. The multidirectional adaptive re-centering torsion isolator according to claim 2, further comprising a first connection plate, wherein the first connection plate is connected to the column on a diaphragm plate level and a second connection plate, wherein the second connection plate is connected to the column on a base plate level.

7. An operation method of a multidirectional adaptive re-centering torsion isolator, comprising the process steps;
connecting each energy dissipater of a plurality of energy dissipaters to a torsion arm and torsion by a rotation of an arm of a plurality of arms,
connecting the arm of the plurality of arms to a rail of a plurality of rails in order to convert an earthquake motion of a structure to a torsion of the plurality of energy dissipaters and the rail of the plurality of rails guiding a motion of the arm of the plurality of arms through a low friction sliding block installed to an end of the arm of the plurality of arms,
controlling the plurality of arms to move along a path pre-determined by the plurality of rails regardless of a direction of a displacement exerted on the rail of the plurality of rails.

* * * * *